United States Patent [19]

Makishima

[11] Patent Number: 4,529,393
[45] Date of Patent: Jul. 16, 1985

[54] INFINITELY VARIABLE BELT-DRIVE TRANSMISSION

[75] Inventor: Sadao Makishima, Akigawa, Japan

[73] Assignee: Fuji Jukogyo Kabushiki Kaisha, Tokyo, Japan

[21] Appl. No.: 592,120

[22] Filed: Mar. 22, 1984

[30] Foreign Application Priority Data

Mar. 23, 1983 [JP] Japan .................................. 58-48402

[51] Int. Cl.³ ............................................. F16H 11/06
[52] U.S. Cl. ......................................... 474/13; 74/689
[58] Field of Search ...................... 474/13, 11, 16, 70, 474/72; 74/687, 689, 339, 701

[56] References Cited

U.S. PATENT DOCUMENTS

| | | | |
|---|---|---|---|
| 3,969,958 | 7/1976 | Miyao et al. | 74/689 |
| 4,304,150 | 12/1981 | Lupo et al. | 474/13 X |
| 4,392,394 | 7/1983 | Hofbauer et al. | 74/689 |
| 4,433,594 | 2/1984 | Smirl | 74/689 |
| 4,467,670 | 8/1984 | Rawamoto | 74/689 |

FOREIGN PATENT DOCUMENTS 129953 8/1982 Japan .................................. 474/13 X Primary Examiner—Stephen J. Novosad
Assistant Examiner—Thuy M. Bui
Attorney, Agent, or Firm—Martin A. Farber

[57] ABSTRACT

An infinitely variable belt-drive transmission for a vehicle, having a clutch for transmitting engine power to wheels of the vehicle, a drive pulley having a hydraulically shiftable disc and a hydraulic cylinder for shifting the disc, a driven pulley having a hydraulically shiftable disc and a hydraulic cylinder for shifting the disc, and a belt engaged with said both pulleys. The transmission comprises an input shaft connected to a driven member of the clutch, a main shaft connected to the drive pulley and a drive gear secured to the input shaft. A synchronizer is securely provided on the main shaft to be engaged with the drive gear, and a counter gear engage with the drive gear. An idler gear is provided to be engaged with a gear on the synchronizer and with a gear of the counter gear so as to provide a reverse drive transmission.

3 Claims, 2 Drawing Figures

INFINITELY VARIABLE BELT-DRIVE TRANSMISSION

BACKGROUND OF THE INVENTION

The present invention relates to an infinitely variable transmission provided with a belt driven pulley device.

Although, in an infinitely belt-drive variable transmission for a vehicle, the transmission ratio is continuously changed, a selector device for changing the transmission to forward drive state, reverse drive state, or neutral state must be provided. U.S. Pat. No. 4,304,150 discloses an infinitely variable belt-drive transmission provided with a selector device at the output shaft of the transmission. The selector device comprises a selector sleeve forming part of a double dog clutch. In order to engage the dog clutch with a corresponding wheel, the engine must be stopped or double-clutching must be done during the driving of the vehicle. This is troublesome operation. However, it is impossible to provide a synchromesh mechanism in the selector device, since the infinitely variable transmission as a synchronized member has a great inertial mass.

Japanese Patent Laid Open No. 57-129955 discloses a selector device comprising a planetary gear device and an hydraulic clutch, which is provided at the input shaft of the transmission. However, the device is very complicated in construction and is expensive. In addition, the length of the engine including the transmission becomes very large, which is disadvantageous for mounting the transmission on a vehicle.

SUMMARY OF THE INVENTION

The object of the present invention is to provide an infinitely variable transmission which is small in size and can be easily manipulated.

To this end, the transmission of the present invention comprises a clutch for transmitting engine power to wheels of the vehicle, a drive pulley, a driven pulley, and a belt engaged with both the pulleys. The transmission comprises an input shaft connected to a driven member of the clutch, a main shaft connected to the drive pulley, a drive gear secured to the input shaft, a synchronizer securely provided on said main shaft. The synchronizer has a synchronizer sleeve engageable with splines provided on the drive gear, and a driven gear. A counter gear comprising a first gear engaged with the drive gear and a second gear is provided. An idler gear is provided to be engaged with the driven gear and the second gear so as to provide a reverse drive transmission.

The other objects and features of this invention will be apparently understood from the following description with reference to the accompanying drawings.

DETAILED DESCRIPTION OF THE PREFERRED EMBODIMENT

Figure 1:
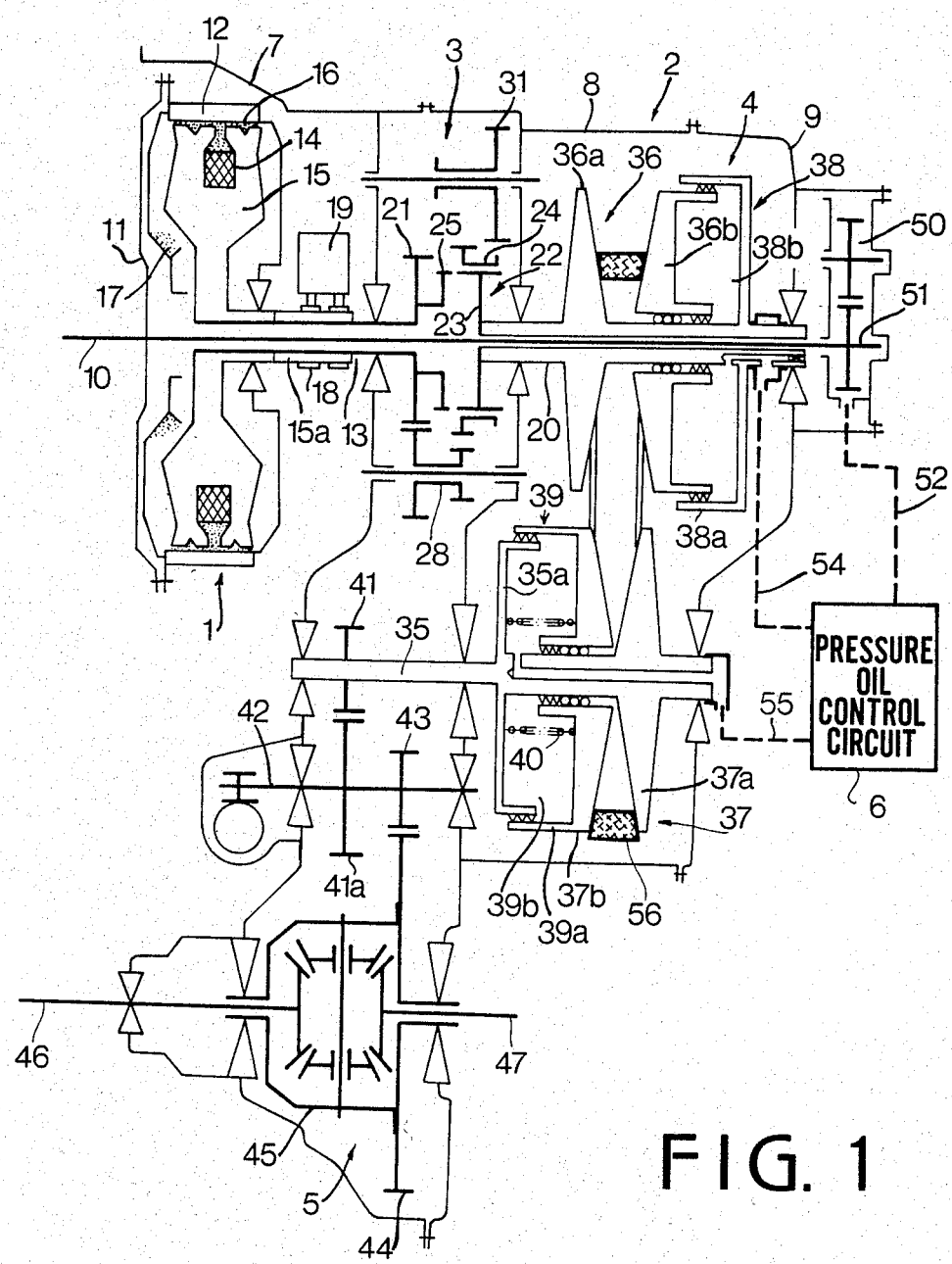
FIG. 1 is a sectional schematic view of an embodiment of the present invention.

Referring to FIG. 1, an infinitely variable belt-drive automatic transmission for a vehicle according to the present invention comprises an electromagnetic powder clutch 1, an infinitely variable belt-drive transmission 2, a selector device 3, pulleys and belt device 4, final reduction device 5, and pressure oil control circuit 6. The electromagnetic powder clutch 1 is provided in a housing 7, and the selector device 3 and pulleys and belt device 4 are provided in a main housing 8 and a side housing 9. A crankshaft 10 of an engine (not shown) is connected to an annular drive member 12 through a drive plate 11 of the electromagnetic powder clutch 1. The electromagnetic powder clutch comprises a driven member 15, a coil 14 provided in the driven member 15. The driven member 15 has its outer periphery spaced from the inner periphery of the drive member 12 by a gap 16, and a powder chamber 17 is defined between the drive member 12 and driven member 15. The powder chamber 17 is filled with powder of magnetic material. The driven member 15 is secured to an input shaft 13 of the belt-drive transmission. A holder 15a secured to the driven member 15 carries slip rings 18 which are electrically connected to the coil 14. The coil 14 is supplied through brushes 19 and slip rings 18 with current from a control circuit for the electromagnetic powder clutch.

When the magnetizing coil 14 is excited by clutch current, driven member 15 is magnetized to produce a magnetic flux passing through the drive member 12. The magnetic powder is aggregated in the gap 16 by the magnetic flux and the driven member 15 is engaged with the drive member 12 by the powder. On the other hand, when the clutch current is cut off, the drive and driven members 12 and 15 are disengaged from one another.

Figure 2:
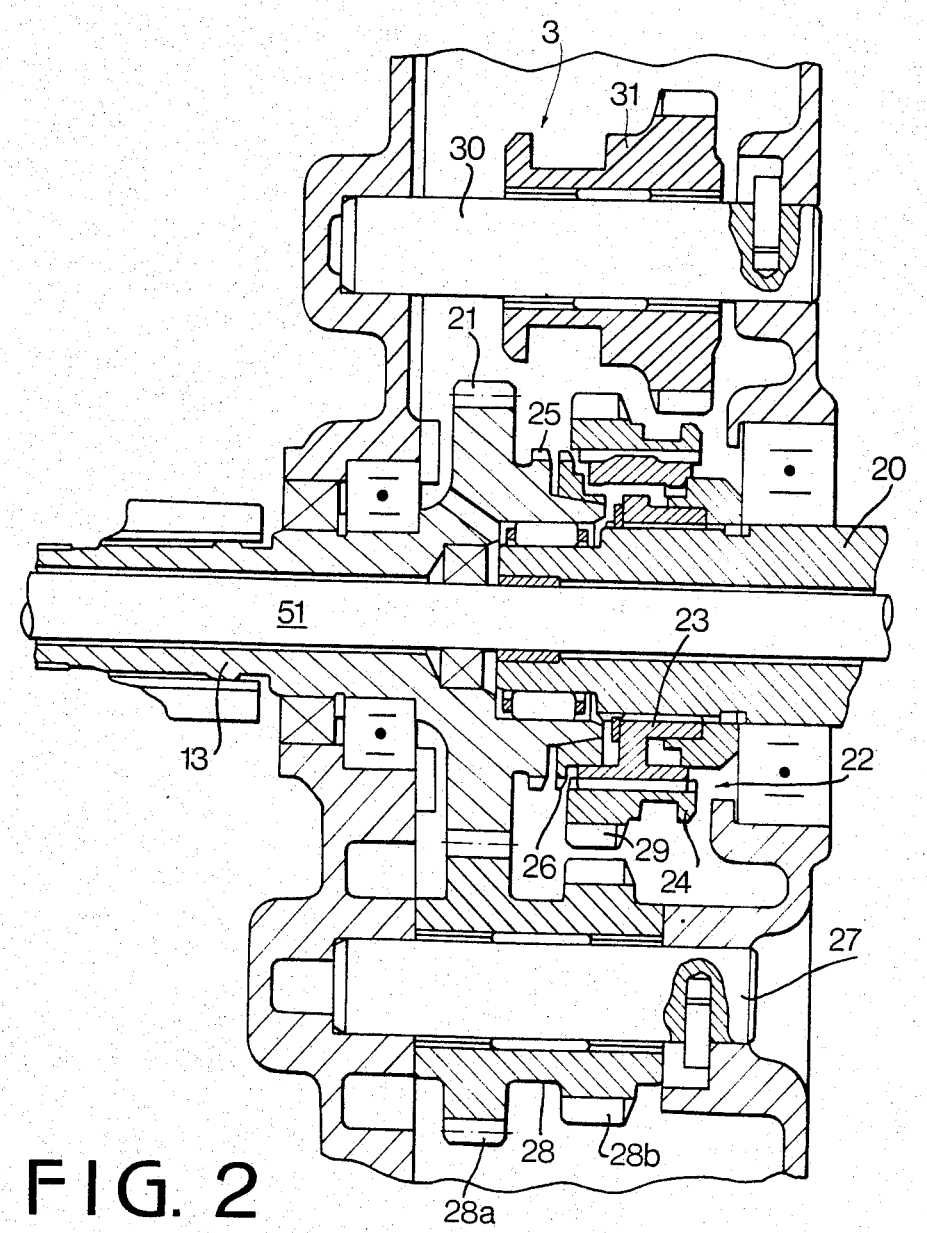
FIG. 2 is a sectional view of a selector device in the transmission of FIG. 2.

In the belt-drive transmission 2, the selector device 3 is provided between the input shaft 13 and a main shaft 20. The main shaft 20 is cylindrical and is disposed coaxially with the input shaft 13. Referring to FIG. 2, the selector device 3 comprises a drive gear 21 integral with input shaft 13 and a synchronizer 22 mounted on the main shaft 20.

The synchronizer 22 comprises a hub 23 secured to the main shaft 20, a synchronizer sleeve 24 slidably engaged with the hub 23 with splines, and a synchronizer ring 26. The synchronizer sleeve 24 is adapted to engage with splines 25 of the drive gear 21. The drive gear 21 meshes with a gear 28a of a counter gear 28 rotatably mounted on a shaft 27. Another gear 28b of the counter gear is positioned to correspond to a driven gear 29 formed on the periphery of the sleeve 24, at the neutral position of the sleeve, as shown in FIG. 2. An idler gear 31 rotatably and slidably mounted on a shaft 30 is adapted to be meshed with gear 29 and gear 28b, when both the gears are at the neutral position.

Referring to FIG. 1, the main shaft 20 has an axial passage in which is mounted an oil pump driving shaft 51 connected to crankshaft 10. An output shaft 35 is provided in parallel with the main shaft 20. A drive pulley 36 and a driven pulley 37 are mounted on shafts 20 and 35. An axially fixed conical disc 36a of the drive pulley 36 is secured to main shaft 20 and an axially movable conical disc 36b is axially slidably mounted the main shaft 20. The movable conical disc 36b also slides in a cylinder 38a secured to the main shaft 20 to form a hydraulic device 38. A chamber 38b of the hydraulic device 38 communicates with a gear pump 50 through a passage 54, the pressure oil control circuit 6, and a passage 52. The gear pump 50 is driven by the shaft 51.

A fixed conical disc 37a of the driven pulley 37 is formed on the output shaft 35 opposite the movable disc 36b and a movable conical disc 37b is slidably mounted on the shaft 35 opposite disc 36a. Movable conical disc 37b has a cylindrical portion 39a in which a cylindrical portion 35a of the output shaft 35 is slidably engaged to form a hydraulic device 39. A chamber 39b of the hydraulic device 39 is communicated with the oil pump 50 through a passage 55 and pressure oil control circuit 6 and passage 52. A drive belt 56 engages with the drive pulley 36 and the driven pulley 37.

Secured to the output shaft 35 is a drive gear 41 which engages with an intermediate reduction gear 41a on an intermediate shaft 42. An intermediate gear 43 secured to shaft 42 engages with a final gear 44. Rotation of the final gear 44 is transmitted to axles 46 and 47 of the vehicle driving wheels through a differential 45.

The pressure oil control circuit 6 is responsive to vehicle speed, engine speed and throttle valve position for controlling the pressure oil supply to chambers 38b and 39b, thereby to move discs 36b and 37b. Thus, transmission ratio is infinitely changed.

Describing the operation of the selector device 3 with reference to FIG. 2, at the neutral position where the sleeve 24 is not engaged with other splines 25 and idler gear 31, the power of the engine is not transmitted to the main shaft 20. When the sleeve 24 is shifted to the left and engaged with splines 25, synchronized by the synchronizer ring 26, the input shaft 13 is connected to main shaft 20 through the synchronizer 22. Thus, the forward drive transmission is established. The shifting of the sleeve can be done during the driving of the vehicle because of the synchronization by the synchronizer 22. Since the inertial mass of drive gear 21, counter gear 28 and driven member 15 is smaller than the total mass of the pulleys and belt device and the selector device which is conventionally disposed at the output shaft of the transmission, the synchronization is easily performed, which means easy manipulation of a shift lever for the selector device.

Under the stationary conditions of the vehicle, when the idler gear 31 is shifted to the gear 29 of synchronizer sleeve 24 positioned at the neutral position, the gear 31 is meshed with the gear 29 and gear 28b. Accordingly, the power is transmitted from the input shaft 13 to the main shaft 20 through gears 21, 28a, 28b, 31 and 29, so that the shaft 20 is rotated in reverse. Thus, the reverse device transmission is provided.

While the presently referred embodiment of the present invention has been shown and described, it is to be understood that this disclosure is for the purpose of illustration and that various changes and modifications may be made without departing from the spirit and scope of the invention as set forth in the appended claim.

What is claimed is:

1. In an infinitely variable belt-drive transmission for a vehicle, having a clutch for transmitting engine power to wheels of the vehicle, a drive pulley having a hydraulically shiftable disc and a hydraulic cylinder for shifting the disc, a driven pulley having a hydraulically shiftable disc and a hydraulic cylinder for shifting the disc, and a belt engaged with said both pulleys, the improvement comprising:
   an input shaft connected to a driven member of said clutch;
   a main shaft connected to said drive pulley;
   a drive gear secured to said input shaft;
   a synchronizer securely provided on said main shaft, said synchronizer comprising a synchronizer sleeve engageable with splines provided on said drive gear, and a driven gear;
   a counter gear comprising a first gear engaged with said drive gear and a second gear; and
   an idler gear engageable with said driven gear and said second gear so as to provide a reverse drive transmission.

2. The infinitely variable belt-drive transmission according to claim 1 wherein said driven gear is formed on the periphery of said synchronizer sleeve.

3. The infinitely variable belt-drive transmission according to claim 1 wherein said driven gear is positioned to correspond to said second gear when said sleeve is not engaged with said splines of said drive gear.

* * * * *